United States Patent [19]

Loqvist et al.

[11] Patent Number: 5,074,720
[45] Date of Patent: Dec. 24, 1991

[54] CUTTING INSERT FOR CHIP FORMING MACHINING

[75] Inventors: Kaj-Ragnar Loqvist; Bengt Strand, both of Fagersta, Sweden

[73] Assignee: Seco Tools AB, Fagersta, Sweden

[21] Appl. No.: 536,794

[22] Filed: Jun. 12, 1990

[30] Foreign Application Priority Data

Jun. 22, 1989 [SE] Sweden .................... 8902282

[51] Int. Cl.$^5$ ............................................ B23B 27/22
[52] U.S. Cl. ......................................... 407/114; 407/116
[58] Field of Search ................ 407/113, 114, 115, 116

[56] References Cited

U.S. PATENT DOCUMENTS

| | | | |
|---|---|---|---|
| 3,973,308 | 8/1976 | Lundgren | 407/114 |
| 4,273,480 | 6/1981 | Shirai et al. | 407/114 |
| 4,479,744 | 10/1984 | Stricker | 407/114 |
| 4,710,069 | 12/1987 | Loqvist | 29/95 R |
| 4,776,733 | 10/1988 | Pettersson | 407/114 |
| 4,880,338 | 11/1989 | Stashko | 407/114 |
| 4,988,242 | 1/1991 | Pettersson et al. | 407/114 |

Primary Examiner—Larry I. Schwartz
Assistant Examiner—Julie R. Daulton
Attorney, Agent, or Firm—Burns, Doane, Swecker & Mathis

[57] ABSTRACT

A cutting insert for chip forming machining of metal workpieces, especially for milling, has an upper face, a lower face and edge faces intersecting the upper face to form cutting edges. A chip upsetting face extends inwardly from the cutting edge and a concavely curved chip face extends inwardly from the chip upsetting face to form a transition edge therewith. The upper face is provided with a number of depressions which are spaced apart along the transition edge. The depressions intersect the transition edge and extend inwardly therefrom. The depression extend non-perpendicularly relative to the cutting edge to form an acute angle with a line perpendicular to the cutting edge. The acute angle is in the range of 5 to 45 degrees. During a cutting action in the depressions cause runners to be formed on the chip bottom, and the runners tend to climb up the sides of the depressions.

13 Claims, 4 Drawing Sheets

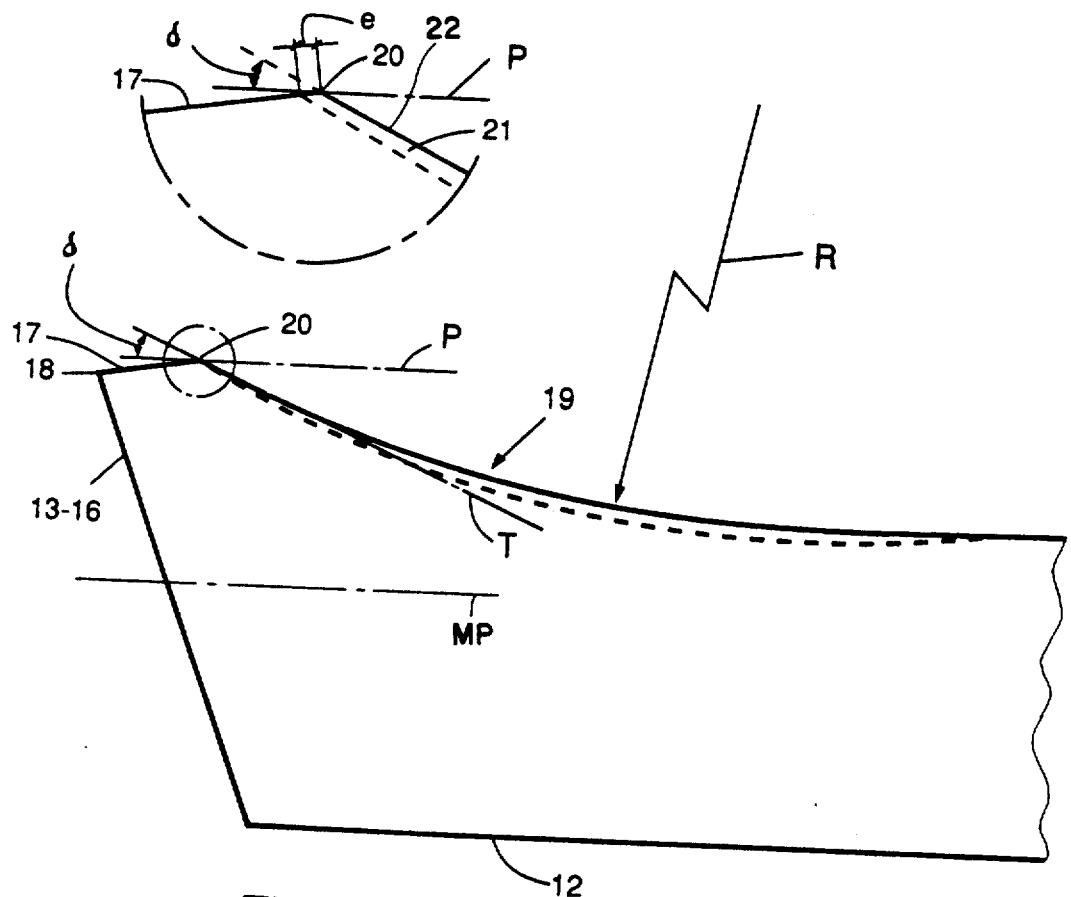
Fig.2A
Fig.2
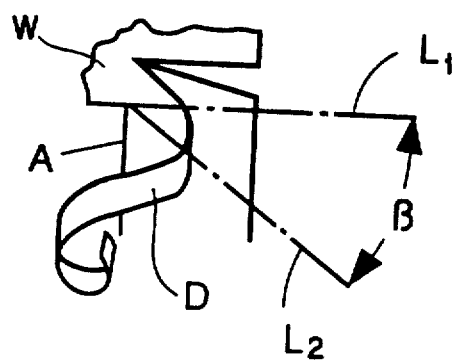
Fig.3
(PRIOR ART)

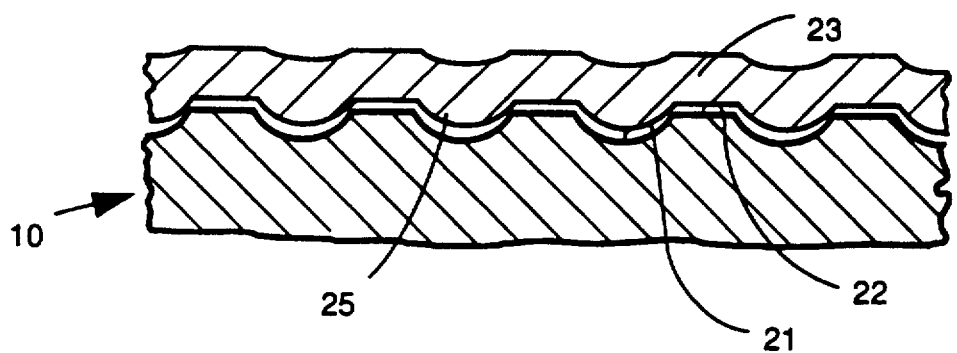
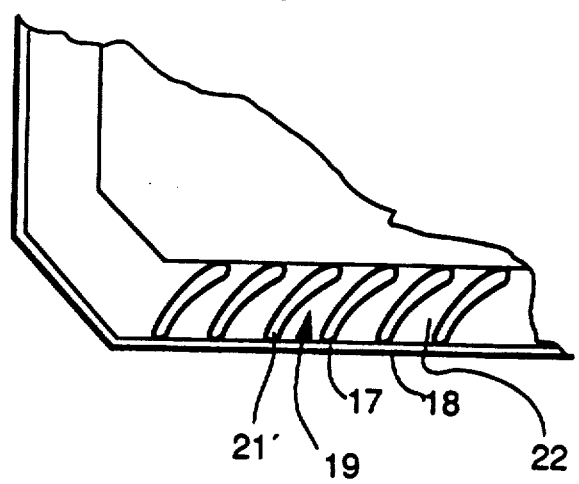

CUTTING INSERT FOR CHIP FORMING MACHINING

BACKGROUND OF THE INVENTION

The present invention relates to a cutting insert for chip forming machining, primarily milling.

A known cutting insert for chip forming machining is disclosed in U.S. Pat. No. 4,710,069, the disclosure includes at least one cutting edge created by the intersection between an upper face and an edge face of the cutting insert. The upper face defines a rake face and the edge face defines a clearance face. The rake face includes a chip upsetting face disposed adjacent to the cutting edge, and a curved chip forming face contiguous with the chip upsetting face. A border line or edge separates the chip upsetting face from the chip forming face. A number of depressions extend inwardly from the chip forming face and are spaced apart in a direction parallel to the cutting edge. The depressions are arranged to bridge the transition line between the chip upsetting face and the chip forming face. During the chip flow, the underside of the chip engages the depressions, whereby beads or runners are formed on the chip underside. This working of the chip produces heating of the chip to facilitate chip deformation.

In that cutting insert, the depressions extend in a direction perpendicular to the cutting edge of the cutting insert. The chip does not travel perpendicularly relative to the transition line, but rather is angled from the perpendicular by a so-called chip flow angle (described hereinafter in connection with FIG. 3), usually of about 5° to 15°. Hence, the chip will be pressed against the sides of the depressions to produce increased friction between the chip and the cutting insert. The friction generates heat, which is transmitted to the insert, thereby causing an unwanted heating of the cutting insert takes place. Such heating will eventually damage the cutting insert.

An object of the present invention is to provide a cutting insert which avoids the negative effects described above by causing the chip to flow in a way producing a smaller contact area and consequently less friction between the chip and the cutting insert.

SUMMARY OF THE INVENTION

The present invention relates to a cutting insert for chip forming machining wherein the cutting edge includes an upper face and at least one edge face intersecting the upper face to form therewith a cutting edge. The upper face defines a rake face, and the edge face defines a clearance face. The rake face includes a chip upsetting face disposed adjacent the cutting edge and a curved chip forming face extending inwardly from the chip upsetting face and forming a transition edge therewith. A plurality of depressions is formed in the chip forming face so as to be spaced apart along the transition edge. The depressions intersect the transition edge and extend inwardly therefrom in a direction non-perpendicularly relative to the cutting edge as the insert is viewed in plan.

Preferably, each of the depressions forms an angle in the range of 5° to 45° relative to an imaginary line extending perpendicularly to the cutting edge. More preferably, that angle is from 10° to 20°, and most preferably is about 15°.

BRIEF DESCRIPTION OF THE DRAWING

The objects and advantages of the invention will become apparent from the following detailed description of preferred embodiments thereof in connection with the accompanying drawings, in which like numerals designate like elements, and in which:

FIG. 2 is a section taken along the line II—II in FIG. 1;

FIG. 2A is a detail in an enlarged scale of an encircled portion of FIG. 2;

FIG. 3 is a top plan view of a fragment of a conventional insert for depicting a chip flowing angle;

FIG. 7 is a section taken along the line VII—VII in FIG. 5;

FIG. 8 is a top plan view of a portion of an alternative embodiment according to the invention.

DETAILED DESCRIPTION OF PREFERRED EMBODIMENTS OF THE INVENTION

Figure 1:
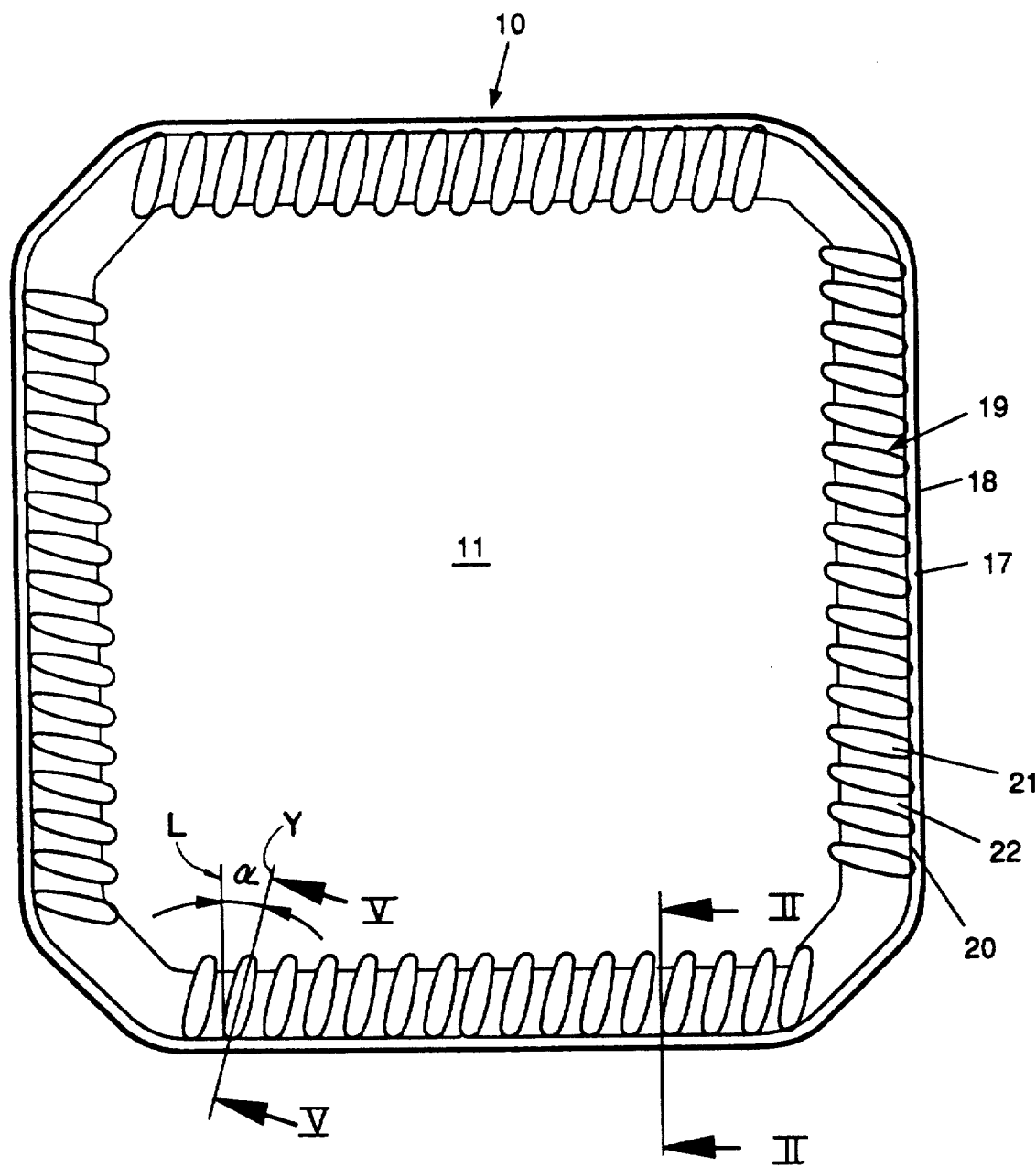
FIG. 1 is a top view of a cutting insert according to the invention.

The cutting insert 10 disclosed in FIG. 1 has a square basic shape and includes a mainly planar upper face 11, a mainly planar lower face 12 and edge faces 13-16 interconnecting the upper and lower faces 11, 12. The cutting insert 10 has a positive geometry, i.e., each edge face forms an acute angle with the upper face 11. However, within the scope of the invention it is possible that the insert could have a negative geometry, wherein each edge face intersects the upper and lower faces perpendicularly.

The upper face 11 includes a continuous chip upsetting face or land 17 constituting the most outer peripheral part of the upper face 11. The intersecting lines between the chip upsetting face 17 and the edge faces 13-16 form main cutting edges 18. A concavely curved chip forming face 19 extends inwardly from the chip upsetting face 17. A transition line or edge 20 is formed by the intersection of the chip upsetting face 17 and the chip forming face 19. That transition edge 20 extends parallel to the respective cutting edge. A number of depressions 21 are formed in the chip forming face and are spaced apart along the transition edge 20. The depressions intersect the transition edge and extend inwardly therefrom (i.e., they extend toward the center of the insert). Preferably, no depressions are formed in the corners of the insert.

Between the depressions 21 the chip forming face 19 forms crests 22, the crests 22 bridging adjacent depressions 21 in a direction along the transition edge 20.

As can be seen from FIG. 1 the depressions 21 do not extend perpendicularly to the transition edge 20 and cutting edge 18, but rather extend non-perpendicularly thereto as the insert is viewed in plan (FIG. 1). Thus, a longitudinal axis Y of the depression forms an acute angle $\alpha$ with a line L oriented perpendicularly to the adherent cutting edge 18 and transition edge. That angle $\alpha$ is within the range of 5° to 45°, preferably within the range of 10° to 20°. A most preferred value for the angle o is about 15°.

From FIG. 2A it is apparent that both the depressions 21 and the crests 22 intersect the transition edge 20. The distance e by which the depressions extend into the chip upsetting face as seen in a direction parallel to the cutting edge (FIG. 2A) is in the range of 0.005–0.1 mm. The maximum depth of the depressions 21 is less than 0.1 mm, preferably within the range of 0.02–0.04.

The chip forming face 19 in the area of the crests preferably has a constant radius of curvature R that preferably is less than 3 mm with preference for values in the range of 2 mm. However, within the scope of the invention it is also possible that the chip forming face 19 could have a constant radius of curvature over only a portion of its extension transverse to the cutting edge 18. The portion of the chip forming face 19 that is closest to the chip upsetting face 17 can be straight. In FIG. 2 the tangent T of the chip forming face 19 is drawn through the intersection point between the chip forming face 19 and the chip upsetting face 17. The angle that the tangent T forms with a line P that is parallel to a median plane MP of the insert (which is parallel to the lower face 12 in the preferred embodiment) is designated by $\delta$. The angle $\delta$ is in the range of 10° to 40°, preferably 20° to 30°, with preference for a value of about 25°. If the portion of the chip forming face 19 that is closest to the chip upsetting face 17 is straight, then the angle is included between an extension of the chip forming face 19 and the line P.

In FIG. 3 the definition of a chip flowing angle is shown. Thus, angle $\beta$ is included between a line $L_1$ extending perpendicularly to the cutting edge A and a line $L_2$ extending in the longitudinal direction of the chip D at its first contact with the cutting insert. Typical values for the angle $\beta$ lie within the range of 5° to 15°.

Figure 4:
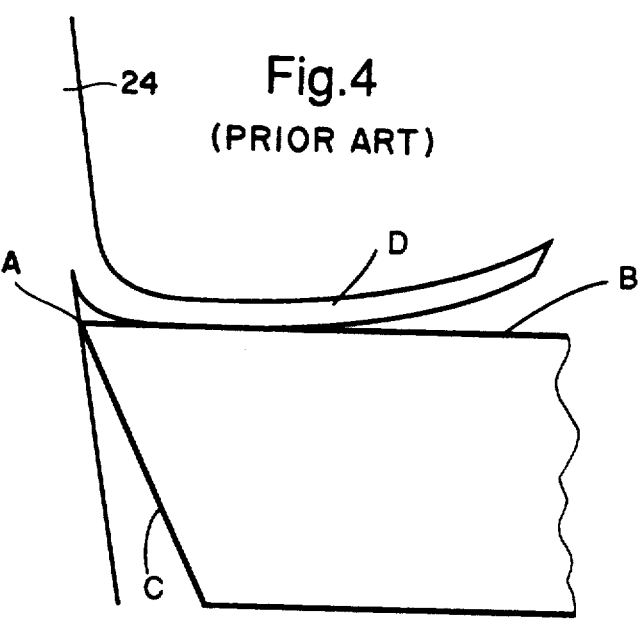
FIG. 4 is a schematic side view of a conventional cutting insert during a cutting operation.

In FIG. 4 a detail of a cutting insert of conventional design is shown. From this figure it can be seen that a cutting edge A is defined by the intersection of the upper face B and the edge face C. When a chip D cut by the cutting edge is released from a metal workpiece it will slide along the chip forming face that coincides with the upper face B of the cutting insert. Due to the design of the chip forming face the contact length of the cutting insert is relatively long and consequently the heat transfer from the chip to the cutting insert is relatively high.

Figure 5:
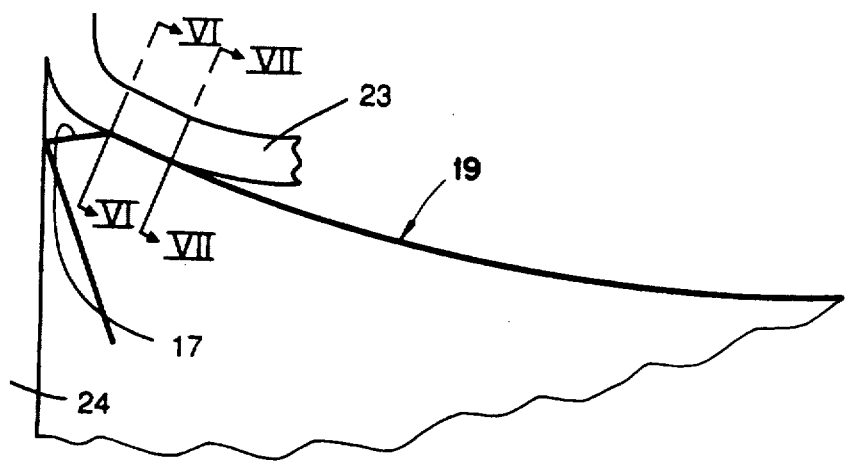
FIG. 5 is a view similar to FIG. 4 of a cutting insert according to the invention.
Figure 6:
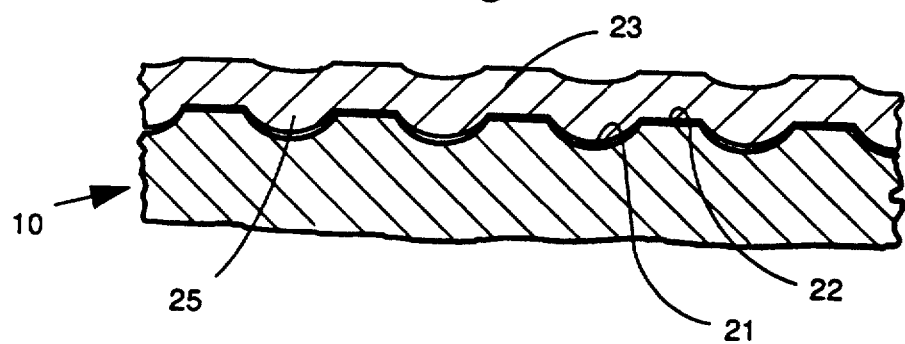
FIG. 6 is a section taken along the line VI—VI in FIG. 5.

In FIGS. 5–7 the flow of a chip when using a cutting insert according to the present invention is depicted. The chip 23 is released from the metal workpiece 24 and slides along the chip upsetting face 17. Simultaneously there is a deforming or upsetting of the chip by the depressions 21, whereby runners or ribs 25 are created on the lower edge of the chip 23. FIG. 6 shows a transverse section through the chip 23 and the cutting insert 10 at the transition between the chip upsetting face 17 and the chip forming face 19, i.e., the location where the runners 25 are created. This deformation or working of the chip 23 increases its temperature and thereby the friction between the chip 23 and the cutting insert 10 is decreased. Due to the curved design of the chip forming face 19, the area of contact between the chip 23 and the cutting insert 10 is decreased and the amount of heat-transferred from the chip 23 to the cutting insert is decreased. Thus, most of the generated heat remains within the chip 23.

A further reduction of the contact area between the chip 23 and the cutting insert 10 is achieved by the non-perpendicular arrangement of the depressions, whereby each depression forms the angle o relative to a line perpendicular to the cutting edge 18 and transition edge. As a result, the chip runners will not be pressed as hard against the depression sides (as would otherwise occur if the depressions extended perpendicularly from the transition edge) and hence less frictional heat is produced. The angle $\alpha$ is of different size than the chip flowing angle $\beta$. This prevents the chips from following along the depressions but rather causes the runners of the chip to "climb" up the sides of the depressions toward the crests 22 of the chip forming face 19, the crests 22 being located between the depressions 21 in the chip forming face 19. The result of this "climbing" of the chip 23 is that the surface contact between the chip 23 and the cutting insert becomes a linear contact rather than a surface or area contact (see FIG. 7). This also creates an increased face pressure in the contact areas and consequently an increased temperature in the chip in a thin surface layer closest to the cutting insert 10, the increased temperature resulting in a further decrease in friction between the chip 23 and the cutting insert 10.

Due to the relatively low amount of heat transferred to the cutting insert, problems related to excessively high temperatures in the cutting edge 18 are avoided, the excessively high temperatures leading to plastic deformation and/or diffusion wear are avoided. This results in a low wear of the cutting edge and consequently longer life even at high temperatures.

The embodiment according to FIG. 8 differs from the embodiment described above (wherein the depressions extend inwardly along a straight path for their entire lengths as viewed in plan) in that the inner ends of the depressions 21' are curved or bent as seen in plan. The effect of such a curved design is that the "climbing" of the chip toward the crests is promoted to a greater extent.

It should also be pointed out that in FIG. 8 the inner ends of the depressions are bent to the right. Within the scope of the invention it is also possible that the inner ends of the depressions could be bent to the left.

The invention is in no way restricted to the embodiments described above. For example, the basic shape of the cutting insert can be triangular or rhombic. Also in other respects the invention can be varied freely within the scope of the appended claims

What is claimed is:

1. A cutting insert for chip forming machining, said cutting insert including an upper face and at least one edge face intersecting said upper face to form therewith a cutting edge, said upper face defining a rake face, and said edge face defining a clearance face, said rake face including a chip upsetting face disposed adjacent to said cutting edge and a concavely curved chip forming face extending inwardly from said chip upsetting face and forming a transition edge therewith, a plurality of depressions formed in said chip forming face so as to be spaced apart along said transition edge, said depressions intersecting said transition edge and extending inwardly therefrom in a direction non-perpendicularly relative to said cutting edge as said insert is viewed in plan, each said depression extending into the chip upsetting face by a distance in the range of 0.005 to 0.1 mm as viewed in a direction parallel to said cutting edge, a first angle being included between a first plane parallel to a median plane of the insert and a second plane which is tangent to said chip forming face and which passes through an intersection of said chip forming face and said chip upsetting face, said first angle being in the range of 10 to 40 degrees.

2. A cutting insert according to claim 1, wherein said transition edge is parallel to said cutting edge.

3. A cutting insert according to claim 1, wherein outer portions of said depressions extend inwardly from said transition edge in a first direction, and inner portions of said depressions extend in a second direction which deviates from said first direction as said insert is viewed in plan.

4. A cutting insert according to claim 1, wherein all of said depressions form identical angles relative to imaginary lines extending perpendicularly to said cutting edge as said insert is viewed in plan.

5. A cutting insert according to claim 1, wherein each of said depressions forms a second angle in the range of 5 to 45 degrees relative to an imaginary line extending perpendicularly to said cutting edge.

6. A cutting insert according to claim 5, wherein said second angle is from 10 to 20 degrees.

7. A cutting insert according to claim 6, wherein said second angle is about 15 degrees.

8. A cutting insert according to claim 1, wherein said first angle is in the range of 20 to 30 degrees.

9. A cutting insert according to claim 8, wherein said first angle is about 25 degrees.

10. A cutting insert according to claim 1, wherein said cutting face is defined by a radius of curvature less than 3 mm.

11. A cutting insert according to claim 10, wherein said radius of curvature is about 2 mm.

12. A cutting insert according to claim 1, wherein each said depression has a maximum depth less than 0.1 mm.

13. A cutting insert according to claim 12, wherein said depth is in the range of 0.02 to 0.04 mm.

* * * * *